United States Patent
Odell et al.

(10) Patent No.: US 6,985,690 B2
(45) Date of Patent: Jan. 10, 2006

(54) FUSER AND FIXING MEMBERS CONTAINING PEI-PDMS BLOCK COPOLYMERS

(75) Inventors: Peter G. Odell, Mississauga (CA); Subajinie Sathiyavanthan, Rexdale (CA); T. Brian McAneney, Burlington (CA); Edward G. Zwartz, Mississauga (CA); Alan R. Kuntz, Webster, NY (US); George A. Riehle, Webster, NY (US); David J. Gervasi, West Henrietta, NY (US); David M. Thompson, Webster, NY (US); Karen A. Moffat, Brantford (CA); Caroline M. Turek, Hamilton (CA)

(73) Assignee: Xerox Corporation, Stamford, CT (US)

( * ) Notice: Subject to any disclaimer, the term of this patent is extended or adjusted under 35 U.S.C. 154(b) by 5 days.

(21) Appl. No.: 10/630,855

(22) Filed: Jul. 31, 2003

(65) Prior Publication Data

US 2005/0025984 A1 Feb. 3, 2005

(51) Int. Cl.
*G03G 15/20* (2006.01)

(52) U.S. Cl. ............ 399/333; 399/328; 399/330; 399/331; 428/447; 428/450

(58) Field of Classification Search ......... 525/474, 525/422, 431, 432, 435, 436, 445; 528/28; 428/447, 450; 399/333, 328, 330, 331; 347/20, 347/100, 137; 430/124
See application file for complete search history.

(56) References Cited

U.S. PATENT DOCUMENTS

| | | | |
|---|---|---|---|
| 3,803,085 A | 4/1974 | Takehoshi et al. | |
| 3,814,869 A | 6/1974 | De Luca | |
| 3,847,867 A | 11/1974 | Heath et al. | |
| 3,850,885 A | 11/1974 | Takehoshi et al. | |
| 3,852,242 A | 12/1974 | White | |
| 3,855,178 A | 12/1974 | White et al. | |
| 3,905,942 A | 9/1975 | Takekoshi et al. | |
| 3,972,902 A | 8/1976 | Heath et al. | |
| 3,983,093 A | 9/1976 | Williams, III et al. | |
| 4,150,181 A | 4/1979 | Smith | |
| 4,455,410 A | 6/1984 | Giles, Jr. | |
| 4,711,818 A | 12/1987 | Henry | |
| 5,051,483 A | 9/1991 | Rock et al. | |
| 5,298,956 A | 3/1994 | Mammino et al. | |
| 5,370,931 A | 12/1994 | Fratangelo et al. | |
| 5,464,703 A | 11/1995 | Ferrar et al. | |
| 5,501,881 A | 3/1996 | Fuller et al. | |
| 5,512,409 A | 4/1996 | Henry et al. | |
| 5,563,202 A | 10/1996 | Ferrar et al. | |
| 5,729,813 A | 3/1998 | Eddy et al. | |
| 5,846,643 A | 12/1998 | Badesha et al. | |
| 5,864,740 A | 1/1999 | Heeks et al. | |
| 5,991,590 A | 11/1999 | Chang et al. | |
| 6,002,910 A | 12/1999 | Eddy et al. | |
| 6,007,657 A | 12/1999 | Eddy et al. | |
| 6,007,918 A | 12/1999 | Tan et al. | |
| 6,011,122 A | 1/2000 | Puyenbroek | |
| 6,037,092 A | 3/2000 | Heeks et al. | |
| 6,072,010 A * | 6/2000 | Puyenbroek | 525/425 |
| 6,116,718 A | 9/2000 | Peeters et al. | |
| 6,136,442 A | 10/2000 | Wong | |
| 6,183,929 B1 * | 2/2001 | Chow et al. | 430/124 |
| 6,201,945 B1 * | 3/2001 | Schlueter et al. | 399/329 |
| 6,265,050 B1 | 7/2001 | Wong et al. | |
| 6,290,342 B1 | 9/2001 | Vo et al. | |
| 6,291,088 B1 | 9/2001 | Wong et al. | |
| 6,302,513 B1 | 10/2001 | Moffat et al. | |
| 6,309,042 B1 | 10/2001 | Veregin et al. | |
| 6,328,409 B1 | 12/2001 | Peeters et al. | |
| 6,340,216 B1 | 1/2002 | Peeters et al. | |
| 6,416,156 B1 | 7/2002 | Noolandi et al. | |
| 6,416,157 B1 | 7/2002 | Peeters et al. | |
| 6,439,711 B1 * | 8/2002 | Carlini et al. | 347/100 |
| 6,454,384 B1 | 9/2002 | Peeters et al. | |
| 6,467,862 B1 | 10/2002 | Peeters et al. | |
| 6,511,149 B1 | 1/2003 | Peeters et al. | |
| 6,523,928 B2 | 2/2003 | Peeters et al. | |
| 2003/0057601 A1 * | 3/2003 | Reitz | 264/239 |

OTHER PUBLICATIONS

J. E. McGrath et al., Progress in Polyimide Chemistry 1, "Synthesis and Characterization of Segmented Polyimide-Polyorganosiloxane Copolymers", H.R. Kricheldorf (editor), Springer, p. 61-106, 2000.

J. de Abajo et al., Progress in Polyimide Chemistry 1, "Processablé Aromatic Polyimides", H.R. Kricheldorf (editor), Springer, p. 23-60, 2000.

* cited by examiner

*Primary Examiner*—Randy Gulakowski
*Assistant Examiner*—Christopher Keehan
(74) *Attorney, Agent, or Firm*—Oliff & Berridge, PLC

(57) ABSTRACT

Polyetherimide-b-polysiloxane block copolymers are useful as surface layers for fuser and fixing members in various printing devices, including electrostatographic imaging systems and ballistic aerosol marking devices. Optionally, the polyetherimide-b-polysiloxane block copolymers are fluorinated, or include at least 50% by weight siloxane.

14 Claims, 3 Drawing Sheets

FUSER AND FIXING MEMBERS CONTAINING PEI-PDMS BLOCK COPOLYMERS

BACKGROUND OF THE INVENTION

1. Field of Invention

This invention relates to fuser and fixing members. More particularly, this invention related to such fuser and fixing members that include a PEI-b-PDMS (polyetherimide-block-polysiloxane, such as PDMS) block copolymer as a surface layer thereon.

2. Description of Related Art

In a typical electrostatographic printing apparatus, a light image of an original to be copied is recorded in the form of an electrostatic latent image upon a photosensitive member and the latent image is subsequently rendered visible by the application of electroscopic thermoplastic resin particles, which are commonly referred to as toner. The visible toner image is then in a loose-powdered form and can be easily disturbed or destroyed. The toner image is usually fixed or fused upon a support, which may be a photosensitive member itself or other support sheet such as plain paper, transparency, specialty coated paper, or the like.

The use of thermal energy for fixing toner images onto a support member is well known. In order to fuse electroscopic toner material onto a support surface permanently by heat, it is necessary to-elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, thermoplastic resin particles are fused to the substrate by heating to a temperature of between about 90° C. to about 160° C. or higher, depending upon the softening range of the particular resin used in the toner. It is not desirable, however, to raise the temperature of the substrate substantially higher than about 200° C. because of the tendency of the substrate to discolor at such elevated temperatures particularly when the substrate is paper.

Several approaches to thermal fusing of electroscopic toner images have been described in the prior art. These methods include providing the application of heat and pressure substantially concurrently by various means, including a roll pair maintained in pressure contact, a belt member in pressure contact with a roll, and the like. Heat may be applied by heating one or both of the rolls, plate members or belt members. The fusing of the toner particles generally takes place when the proper combination of heat, pressure and contact time is provided. The balancing of these parameters to bring about the fusing of the toner particles is well known in the art, and they can be adjusted to suit particular machines, process conditions, and printing substrates.

During operation of a fusing system in which heat is applied to cause thermal fusing of the toner particles onto a support, both the toner image and the support are passed through a nip formed between the roll pair, or plate and/or belt members. The concurrent transfer of heat and the application of pressure in the nip affect the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus, increasing the background or interfering with the material being copied there. The so called "hot offset" occurs when the temperature of the toner is raised to a point where the toner particles liquefy and a splitting of the molten toner takes place during the fusing operation with a portion remaining on the fuser member.

The hot offset temperature or degradation of the hot offset temperature is a measure of the release property of the fuser roll, and accordingly it is desired to provide a fusing surface that has a low surface energy to provide the necessary release. To ensure and maintain good release properties of the fuser roll, it has become customary to apply release agents to the fuser members to ensure that the toner is completely released from the fuser roll during the fusing operation. Typically, these materials are applied as thin films of, for example, silicone oils to prevent toner offset. In addition to preventing hot offset, it is desirable to provide operational latitude as large as possible. By operational latitude it is intended to mean the difference in temperature between the minimum temperature required to fix the toner to the paper, the minimum fix temperature, and the temperature at which the hot toner will offset to the fuser roll, the hot offset temperature.

Generally, fuser and fixing rolls are prepared by applying one or more layers to a suitable substrate. For example, cylindrical fuser and fixer rolls are typically prepared by applying a fluoroelastomer layer, with or without additional layers, to an aluminum core. The coated roll is then heated in a convection oven to cure the fluoroelastomer material. Such processing is disclosed in, for example, U.S. Pat. Nos. 5,501,881, 5,512,409 and 5,729,813, the entire disclosures of which are incorporated herein by reference.

Surface layers of these types of members in an electrostatographic device thus typically have comprised silicone rubber or fluoroelastomers as a preferred material. For example, conventional materials known in the art as useful for intermediate transfer member surfaces include silicone rubbers, fluorocarbon elastomers such as are available under the trademark VITON™ from E.I. du Pont de Nemours & Co., polyvinyl fluoride such as available under the tradename TEDLAR™ also available from E.I. du Pont de Nemours & Co, various fluoropolymers such as polytetrafluoroethylene (PTFE), perfluoroalkoxy (PFA-TEFLON™), fluorinated ethylenepropylene copolymer (FEP), other TEFLON™-like materials, and the like and mixtures thereof.

U.S. Pat. No. 6,037,092, incorporated herein by reference in its entirety, discloses a fuser member comprising a substrate and at least one layer thereover, the layer comprising a crosslinked product of a liquid composition which comprises (a) a fluorosilicone, (b) a crosslinking agent, and (c) a thermal stabilizing agent comprising a reaction product of (i) a cyclic unsaturated-alkyl-group-substituted polyorganosiloxane, (ii) a linear unsaturated-alkyl-group-substituted polyorganosiloxane, and (iii) a metal acetylacetonate or metal oxalate compound.

U.S. Pat. No. 5,991,590, incorporated herein by reference in its entirety, describes a transfer member having a substrate, an outer silicone rubber layer, and a silicone polymer release agent material, wherein the release agent material is a polydimethyl siloxane cationic liquid emulsion.

U.S. Pat. No. 5,846,643 describes a fuser member for use in an electrostatographic printing machine has at least one layer of an elastomer composition comprising a silicone elastomer and a mica-type layered silicate, the silicone elastomer and mica-type layered silicate forming a delaminated nanocomposite with silicone elastomer inserted among the delaminated layers of the mica-type layered silicate.

U.S. Pat. No. 6,007,918 describes a fusing belt employing a polyimide substrate comprising a block copolymer derived from hexafluoroisopylidene-2,2'-bisphthalic anhydride 5-amino-(4-aminophenyl)-1,1,3-trimethylindane, and aminopropyl terminated polydimethylsiloxane.

U.S. Pat. No. 5,864,740 discloses a thermally stabilized silicone liquid composition and a toner fusing system using the thermally stabilized silicone liquid as a release agent, wherein the thermally stabilized silicone liquid contains a silicone liquid and a thermal stabilizer composition (including a reaction product from at least a polyorganosiloxane and a platinum metal compound (Group VIII compound) such as a ruthenium compound, excluding platinum).

U.S. Pat. No. 4,150,181 discloses a contact fuser assembly and method for preventing toner offset on a heated fuser member in an electrostatic reproducing apparatus which includes a base member coated with a solid, abrasion resistant material such as polyimide, poly(amide-imides), poly(imide-esters), polysulfones, and aromatic polyamides. The fuser member is coated with a thin layer of polysiloxane fluid containing low molecular weight fluorocarbon. Toner offset on the heated fuser member is prevented by applying the polysiloxane fluid containing fluorocarbon to the solid, abrasion resistant surface of the fuser member.

U.S. Pat. No. 4,711,818 discloses a thermally conductive dry release member and fusing method for use in electrostatic reproducing machines without the application of a release agent. The fuser member comprises a base support member and a thin deformable layer of a composition coated thereon, the composition comprising the crosslinked product of a mixture of at least one addition curable vinyl terminated or vinyl pendant polyfluoroorganosiloxane, filler, heat stabilizer, a crosslinking agent, and a crosslinking catalyst.

U.S. Pat. Nos. 5,464,703 and 5,563,202 disclose a fuser member useful for heat fixing an electrographic toner to a substrate, a composition of matter, and its preparation method. The fuser member has a core and a base cushion layer overlying the core. The base cushion layer includes a crosslinked poly(dimethylsiloxane-fluoroalkylsiloxane) elastomer that has tin oxide particles dispersed therein in a concentration of from 20 to 40 percent of the total volume of the base cushion layer.

An alternative process to conventional electrostatographic imaging is the recently developed process of ballistic aerosol marking. Ballistic aerosol marking is a process for applying a marking material to a substrate, directly or indirectly. In particular, the ballistic aerosol marking system includes a propellant that travels through a channel, and a marking material that is controllably (i.e., modifiable in use) introduced, or metered, into the channel such that energy from the propellant propels the marking material to the substrate. The propellant is usually a dry gas that can continuously flow through the channel while the marking apparatus is in an operative configuration (i.e., in a power-on or similar state ready to mark). Examples of suitable propellants include carbon dioxide gas, nitrogen gas, clean dry ambient air, gaseous products of a chemical reaction, or the like; preferably, non-toxic propellants are employed, although in certain embodiments, such as devices enclosed in a special chamber or the like, a broader range of propellants can be tolerated. The system is referred to as "ballistic aerosol marking" in the sense that marking is achieved by in essence launching a non-colloidal, solid or semi-solid particulate, or alternatively a liquid, marking material at a substrate. The shape of the channel can result in a collimated (or focused) flight of the propellant and marking material onto the substrate.

The propellant can be introduced at a propellant port into the channel to form a propellant stream. A marking material can then be introduced into the propellant stream from one or more marking material inlet ports. The propellant can enter the channel at a high velocity. Alternatively, the propellant can be introduced into the channel at a high pressure, and the channel can include a constriction (for example, de Laval or similar converging/diverging type nozzle) for converting the high pressure of the propellant to high velocity. In such a situation, the propellant is introduced at a port located at a proximal end of the channel (the converging region), and the marking material ports are provided near the distal end of the channel (at or further down-stream of the diverging region), allowing for introduction of marking material into the propellant stream.

In the situation where multiple ports are provided, each port can provide for a different color (for example, cyan, magenta, yellow, and black), pre-marking treatment material (such as a marking material adherent), post-marking treatment material (such as a substrate surface finish material, for example, matte or gloss coating, or the like), marking material not otherwise visible to the unaided eye (for example, magnetic particle-bearing material, ultraviolet-fluorescent material, or the like) or other marking material to be applied to the substrate. Examples of materials suitable for pre-marking treatment and post-marking treatment include polyester resins (either linear or branched); poly(styrenic) homopolymers; poly(acrylate) and poly(methacrylate) homopolymers and mixtures thereof; random copolymers of styrenic monomers with acrylate, methacrylate, or butadiene monomers and mixtures thereof; polyvinyl acetals; poly(vinyl alcohol)s; vinyl alcohol-vinyl acetal copolymers; polycarbonates; mixtures thereof; and the like. The marking material is imparted with kinetic energy from the propellant stream, and ejected from the channel at an exit orifice located at the distal end of the channel in a direction toward a substrate.

One or more such channels can be provided in a structure which, in one embodiment, is referred to herein as a printhead. The width of the exit (or ejection) orifice of a channel is typically on the order of about 250 microns or smaller, and preferably in the range of about 100 microns or smaller. When more than one channel is provided, the pitch, or spacing from edge to edge (or center to center) between adjacent channels can also be on the order of about 250 microns or smaller, and preferably in the range of about 100 microns or smaller. Alternatively, the channels can be staggered, allowing reduced edge-to-edge spacing. The exit orifice and/or some or all of each channel can have a circular, semicircular, oval, square, rectangular, triangular or other cross-sectional shape when viewed along the direction of flow of the propellant stream (the channel's longitudinal axis).

The marking material to be applied to the substrate can be transported to a port by one or more of a wide variety of ways, including simple gravity feed, hydrodynamic, electrostatic, ultrasonic transport, or the like. The material can be metered out of the port into the propellant stream also by one of a wide variety of ways, including control of the transport mechanism, or a separate system such as pressure balancing, electrostatics, acoustic energy, ink jet, or the like.

The marking material to be applied to the substrate can be a solid or semi-solid particulate material, such as a toner or variety of toners in different colors, a suspension of such a marking material in a carrier, a suspension of such a marking material in a carrier with a charge director, a phase change material, or the like. Preferably the marking material is particulate, solid or semi-solid, and dry or suspended in a liquid carrier. Such a marking material is referred to herein as a particulate marking material. A particulate marking material is to be distinguished from a liquid marking material, dissolved marking material, atomized marking material, or similar non-particulate material, which is generally referred to herein as a liquid marking material. However, ballistic aerosol marking processes are also able to utilize such a liquid marking material in certain applications.

Ballistic aerosol marking processes also enable marking on a wide variety of substrates, including direct marking on non-porous substrates such as polymers, plastics, metals, glass, treated and finished surfaces, and the like. The reduction in wicking and elimination of drying time also provides improved printing to porous substrates such as paper, textiles, ceramics, and the like. In addition, ballistic aerosol marking processes can be configured for indirect marking, such as marking to an intermediate transfer roller or belt, marking to a viscous binder film and nip transfer system, or the like.

The marking material to be deposited on a substrate can be subjected to post ejection modification, such as fusing or drying, overcoating, curing, or the like. In the case of fusing, the kinetic energy of the material to be deposited can itself be sufficient effectively to melt the marking material upon impact with the substrate and fuse it to the substrate. The substrate can be heated to enhance this process. Pressure rollers can be used to cold-fuse the marking material to the substrate. In-flight phase change (solid-liquid-solid) can alternatively be employed. A heated wire in the particle path is one way to accomplish the initial phase change. Alternatively, propellant temperature can accomplish this result. In one embodiment, a laser can be employed to heat and melt the particulate material in-flight to accomplish the initial phase change. The melting and fusing can also be electrostatically assisted (i.e., retaining the particulate material in a desired position to allow ample time for melting and fusing into a final desired position). The type of particulate can also dictate the post-ejection modification. For example, ultraviolet curable materials can be cured by application of ultraviolet radiation, either in flight or when located on the material-bearing substrate.

Since propellant can continuously flow through a channel, channel clogging from the build-up of material is reduced (the propellant effectively continuously cleans the channel). In addition, a closure can be provided that isolates the channels from the environment when the system is not in use. Alternatively, the printhead and substrate support (for example, a platen) can be brought into physical contact to affect a closure of the channel. Initial and terminal cleaning cycles can be designed into operation of the printing system to optimize the cleaning of the channel(s). Waste material cleaned from the system can be deposited in a cleaning station. It is also possible, however, to engage the closure against an orifice to redirect the propellant stream through the port and into the reservoir thereby to flush out the port.

Further details on the ballistic aerosol marking process are disclosed in, for example, U.S. Pat. Nos. 6,511,149, 6,416,157, 6,340,216, 6,523,928, 6,467,862, 6,290,342, 6,328,409, 6,454,384, 6,136,442, 6,416,156, 6,116,718, 6,265,050, 6,291,088, 6,309,042, and 6,302,513, and U.S. patent application Ser. No. 09/163,799, filed Sep. 30, 1998, the entire disclosures of which are incorporated herein by reference.

Silicone rubbers are widely used in fusing subsystems, in conventional electrostatographic imaging. However silicone rubbers employed on the surface of fuser rolls lack the wear resistance required of a digital color printer.

Accordingly, while known compositions and processes are suitable for their intended purposes, a need remains for improved materials with better wear resistance. Further, a need remains for a fuser, pressure, transfer and/or transfix member surface layer that does not result in significant surface degradation and loss of transfer properties of the outer layer of the member during operation

SUMMARY OF THE INVENTION

To overcome the above problems of conventional fuser and fixing members, and to improve the printing processes, the present inventors have provided the improved materials and products described herein.

In embodiments, the present invention provides novel polyetherimide-block-polysiloxane block copolymers, such as PEI-b-PDMS block copolymers. The novel polyetherimide-block-polysiloxane block copolymers can be produced having varying ratios of the respective polyetherimide and polysiloxane segments, and where one or more of the respective polyetherimide and polysiloxane segments is optionally substituted with materials such as halogens.

In embodiments, the present invention provides improved fuser and fixing members, where the surface layer comprises the above-described novel block copolymers. In conventional electrostatographic imaging processes, the improved fuser and fixing members provide improved toner release from the member, both in modes utilizing a release agent such as oil or modes omitting such a release agent, while improving the life of the member and providing improved final image quality. In other printing processes, such as ballistic aerosol marking processes, the improved fuser and fixing members or transfuse and transfix members, provide improved capture efficiency of the toner on the substrate surface, which in turn provides improved final print quality.

More particularly, the present invention provides novel block copolymers having the following general formula:

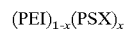

where PEI represents optionally substituted polyetherimide segments and PSX represents optionally substituted polysiloxane segments. In the present invention, the novel block copolymers can be in the form of conventional block copolymers, such as A–B block copolymers (where there exists a string of A blocks followed by a string of B blocks). However, preferably, the novel block copolymers are in the form of random multiple blocks or segments, such as referred to as "randomly segmented copolymers" where the A and B blocks are randomly distributed in the polymer chain. See, for example, J. E. McGrath et al., *Progress in Polyimide Chemistry* 1, H. R. Kricheldorf (editor), Springer, p.61–106, 2000. Thus, for example, the PSX segment length can be determined by the length of the added diamino PDMS, while the PEI can form first as polyamic acid segments in the polymerization, which are later converted to polyimide.

In other embodiments, the present invention provides members, such as fusing members, fixing members, transfuse members, transfix members, and the like, whose surface layer comprises the above-described novel block copolymers.

The present invention also provides methods for making the novel block copolymers, and methods for making the improved fuser and fixing members.

BRIEF DESCRIPTION OF THE DRAWINGS

Various exemplary embodiments of the systems and methods of this invention described in detail below, with reference to the attached drawing figures, in which.

DETAILED DESCRIPTION OF EXEMPLARY EMBODIMENTS

Figure 1:
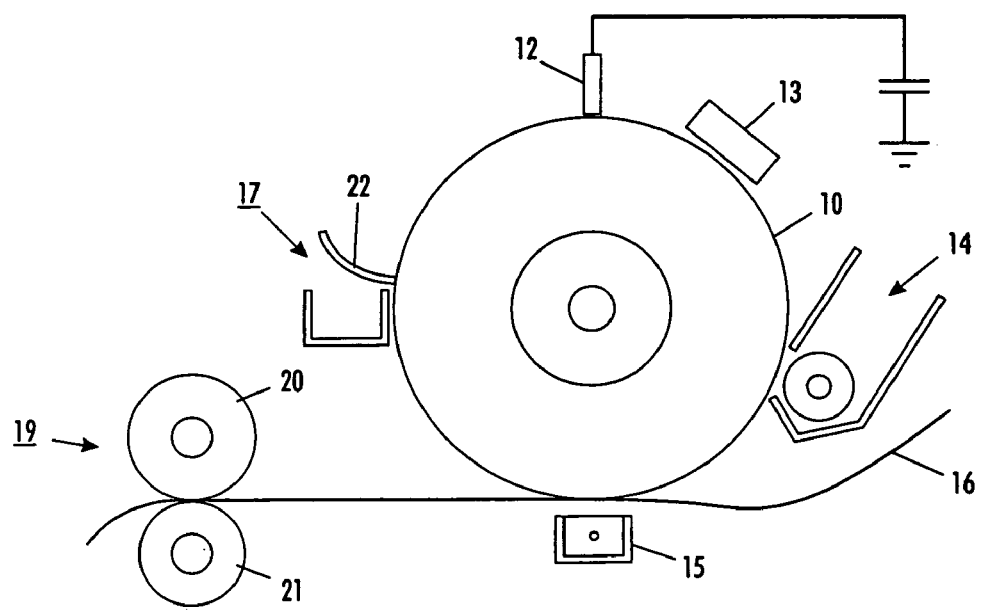
FIG. 1 is an illustration of a general electrostatographic apparatus.

The surface layer of the members used in such imaging systems as electrostatographic and ballistic aerosol marking copying devices according to the present invention is comprised of a novel polyetherimide-b-polysiloxane block copolymer. The novel copolymers may generally be represented by the following general formula (I):

$$(PEI)_{1-x}(PSX)_x \quad (I)$$

wherein PEI represents an optionally substituted polyetherimide segment and PSX represents an optionally substituted polysiloxane segment, and x represents the mole ratio between the PEI and PSX segments, where x is a number greater than zero but less than one.

As described briefly above, the novel block copolymers according to the present invention can be in the form of ordered block copolymers, such as conventional A–B block copolymers (where there exists a string of A blocks followed by a string of B blocks). However, preferably, the novel block copolymers are in the form of random multiple blocks or segments, such as referred to as "randomly segmented copolymers" where the A and B blocks are randomly distributed in the polymer chain. The above formula (I) $(PEI)_{1-x}(PSX)_x$ thus represents any such block copolymers, unless otherwise noted, and only indicates the presence of x number of PSX blocks and (1-x) number of PEI blocks in the polymer chain.

In formula (I), the PEI segment can be any suitable polyetherimide segment, and can be a monomer, oligomer, polymer, or the like. Polyetherimide segments suitable for use in the composition of the present invention are known compounds whose preparation and properties are known in the art as represented, for example, by U.S. Pat. Nos. 3,803,085, 3,905,942, 3,847,867, 3,814,869, 3,850,885, 3,852,242 3,855,178, 3,983,093, 5,051,483 and 6,011,122, the entire disclosures of which are incorporated herein by reference.

In a preferred embodiment, the polyetherimide segment is a structural unit of the formula (II):

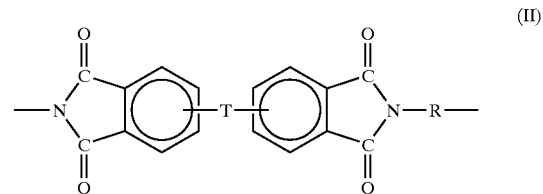

(II)

wherein the divalent T moiety bridges the 3,3', 3,4', 4,3', or 4,4' positions of the aryl rings of the respective aryl imide moieties of formula (II); T is —O— or a group of the formula —O-Z-O—; Z is a divalent radical selected from the group consisting of formulae (III)

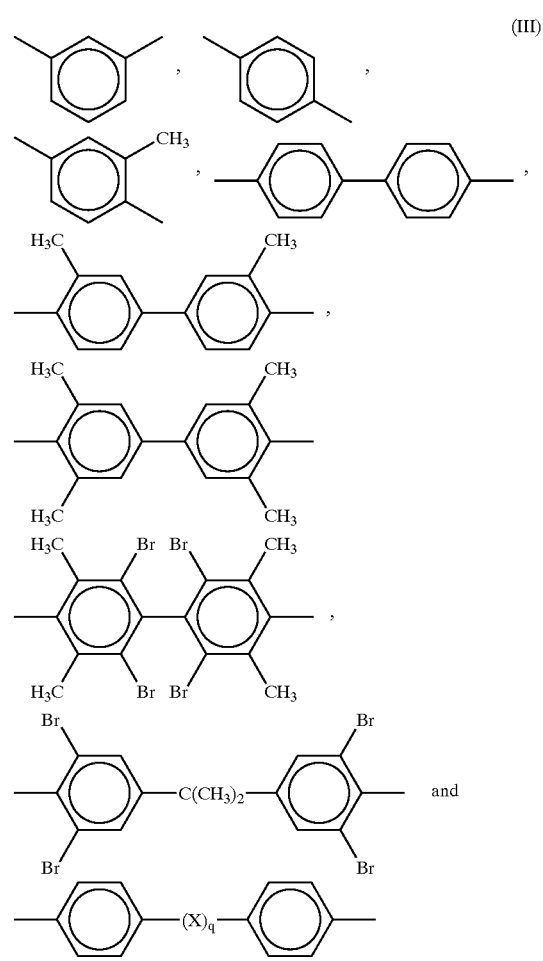

(III)

wherein X is a member selected from the group consisting of divalent radicals of the formulae (IV):

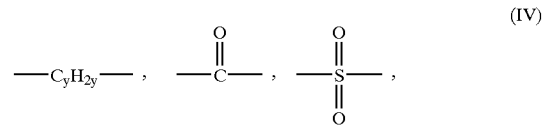

(IV)

-continued

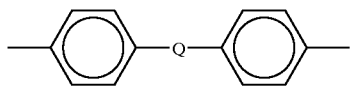

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (V):

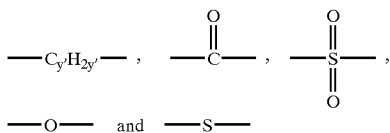

(V)

where Q is a member selected from the group consisting of formulae (VI):

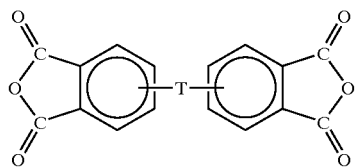

(VI)

where y' is an integer from about 1 to about 5.

In a preferred embodiment, the polyetherimide segment in the copolymer of the present invention can be made according to procedures well known in the art. For example, the polyetherimide segment can be made by the reaction of an aromatic bis(ether anhydride) of the following formula (VII):

(VII)

with an organic diamine of the formula (VII):

H₂N—R—NH₂ (VIII)

Wherein T and R are as described above.

In general, the reactions can be carried out employing well-known solvents or mixtures of solvents. For example, it has been found that the combination of N-methylpyrrolidone and tetrahydrofuran provides preferred results in that the combination of solvents dissolves both the diamine and particularly the dianhydride (which requires both solvents), while the tetrahydrofuran also aids the solubility of the siloxane. Preferably, the solvents used in the process are dry (i.e., have minimal water content). The reaction between diamine and dianhydride generally takes place at ambient temperatures to form a polyamic acid. The polyamic acids are generally found to have greater solubility than the polyimide that is formed from it. This behavior conveniently allows for facile coating and then subsequent heating of the coating forms the desired polyimide through the removal of solvent and the water by-product of the ring closing, as shown in the following reaction scheme:

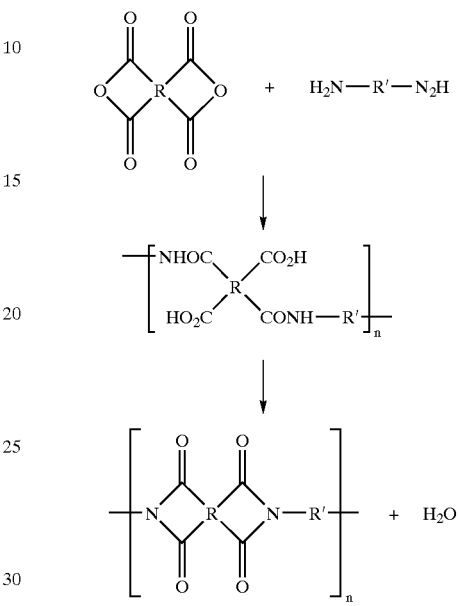

Examples of specific aromatic bis(ether anhydrides) and organic diamines are disclosed, for example, in U.S. Pat. Nos. 3,972,902 and 4,455,410, the entire disclosures of which are incorporated herein by reference. Other examples of specific suitable anhydrides and diamines are disclosed, for example, in J. de Abajo et al., *Progress in Polyimide Chemistry* 1, H. R. Kricheldorf (editor), Springer, p. 23–60, 2000 (see, in particular, Tables 1–4), the entire disclosure of which is incorporated herein by reference. Table 6 of the same reference includes a list of fluorinated monomers, which also can be used in embodiments of the present invention. Illustrative examples of aromatic bis(ether anhydride)s include: 2,2-bis(4-(3,4-dicarboxyphenoxy)phenyl) propane dianhydride; 4,4'-bis(3,4-dicarboxyphenoxy)diphenyl ether dianhydride; 4,4'-bis(3,4-dicarboxyphenoxy) diphenyl sulfide dianhydride; 4,4'-bis(3,4-dlicarboxyphenoxy)benzophenone dianhydride; 4,4'-bis(3, 4-dicarboxyphenoxy)diphenyl sulfone dianhydride; 2,2-bis ([4-(2,3-dicarboxyphenoxy) phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzopheno dianhydride; 4,4'-bis(2,3-dicarboxyphenoxy)diphenyl sulfone dianhydride; 4-(2,3-dicarboxyphenoxy)-4'-3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures thereof.

A preferred class of aromatic bis(ether anhydride)s included by formula (VII) above includes compounds wherein T is of the formula (IX):

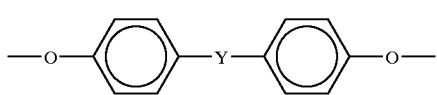

(IX)

wherein each Y is independently selected from the group consisting of formulae (X):

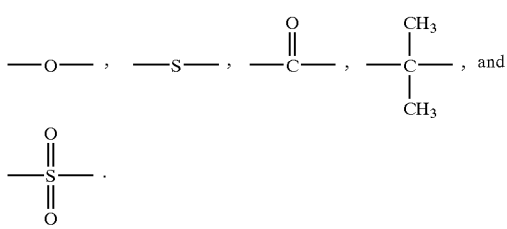

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent. Such preparation methods are well known in the art.

Suitable organic diamines of formula (VIII) include, for example: m-phenylenediamine; p-phenylenediamine; 4,4'-diaminodiphenylpropane, 4,4'-diaminodiphenylmethane (commonly named 4,4'-methylenedianiline); 4,4'-diaminodiphenyl sulfide; 4,4'-diaminodiphenyl sulfone; 4,4'-diaminodiphenyl ether (commonly named 4,4'-oxydianiline); 1,5-diaminonaphthalene; 3,3-dimethylbenzidine; 3,3-dimethoxybenzidine; 2,4-bis(beta-amino-t-butyl)toluene; bis(p-beta-amino-t-butylphenyl)ether; bis(p-beta-methyl-o-aminophenyl)benzene; 1,3-diamino-4-isopropylbenzene; 1,2-bis(3-aminopropoxy)ethane; benzidine; m-xylylenediamine; 2,4-diaminotoluene; 2,6-diaminotoluene; bis(4-aminocyclohexyl)methane; 3-methylheptamethylenediamine; 4,4-dimethylheptamethylenediamine; 2,11-dodecanediamine; 2,2-dimethylpropylenediamine; 1,18-octamethylenediamine; 3-methoxyhexamethylenediamine; 2,5-dimethylhexamethylenediamine; 2,5-dimethylheptamethylenediamine; 3-methylheptamethylenediamine; 5-methylnonamethylenediamine; 1–4-cyclohexanediamine; 1,18-octadecanediamine; bis(3-aminopropyl)sulfide; N-methyl-bis(3-aminopropyl)amine; hexamethylenediamine; heptamethylenediamine; nonamethylenediamine; decamethylenediamine and mixtures of such diamines.

Next will be described the PSX segment of the PEI-PSX copolymer. In formula (I), the PSX segment can be any suitable polysiloxane segment, and can be a monomer, oligomer, polymer, or the like. Polysiloxane segments suitable for use in the composition of the present invention are known compounds whose preparation and properties are known in the art as represented, for example, by U.S. Pat. Nos. 6,011,122 and 5,051,483, the entire disclosures of which are incorporated herein by reference. In a preferred embodiment, the siloxane segment of the copolymer of the present invention has structural units according to formula (XI):

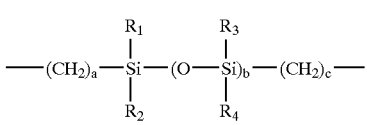

(XI)

wherein: $R_1$, $R_2$, $R_3$ and $R_4$ are each independently ($C_1$–$C_6$) alkyl, preferably methyl or ethyl, a and c are each independently integers from 1 to 10, preferably from 1 to 5, most typically a=c=3 and b is an integer from 1 to about 400, preferably from 40 to 48. In still further embodiments, a mixture of different polysiloxane segments can be used, to provide desired results. For example, the Examples below provide an example where a mixture of siloxane chain lengths, where about 88% of the siloxane has a value of b=~48 and 11% of the siloxane has a value of b=~364. Of course, it will be recognized that b is generally an average number with a distribution of chain lengths.

As used herein, the term "($C_1$–$C_6$)alkyl" means a straight or branched alkyl group of from 1 to 6 carbon atoms per group, such as, for example, methyl, ethyl, n-butyl, isobutyl, t-butyl, pentyl, hexyl.

In a preferred embodiment, the PEI-PSX copolymer is made in a manner similar to that described above for the polyetherimide segments, except that all or a portion of the diamine reactant is replaced by an aminoalkyl-terminated organosiloxane compound of the structural formula (XI):

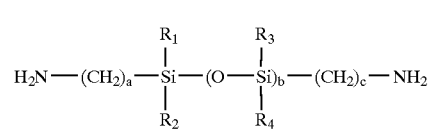

(XII)

wherein $R_1$, $R_2$, $R_3$, $R_4$, a, b and c are each defined as above.

In a preferred embodiment, $R_1$, $R_2$, $R_3$, $R_4$ are each methyl, a and c are each 3 and b has an average value of from 9 to 400 (see comment above).

In a preferred embodiment, the polyetherimide-polysiloxane copolymer is made by reacting an aromatic bis(ether anhydride) with an organic diamine and an amine-terminated organosiloxane compound. The diamine and amine-terminated organosiloxane may be physically mixed prior to reaction with the aromatic bis(ether anhydride) in order to form a random siloxane-polyetherimide copolymer, or, alternatively, the diamine and amine-terminated organosiloxane may be reacted with the aromatic bis(ether anhydride) in series in order to form an alternating or block copolymer.

In embodiments of the present invention, the PEI-PSX copolymer can have any ratio of PEI segments to PSX segments, as desired. Thus, for example, the ratio, x, of segments in the formula $(PEI)_{1-x}$-$(PSX)_x$ can be from greater than zero to less than one, such as from about 0.01 to about 0.99. Preferably, the ratio x is from about 0.4 to about 0.8 or from about 0.4 to about 0.6, more preferably from about 0.45 to about 0.75 or from about 0.45 to about 0.55, and even more preferably about 0.5 to about 0.6. In some embodiments, the value of x can be decreased if the properties of the copolymer are otherwise compensated for, such as by introduction of fluorine content into the polymer chain. Thus, for example, it has been found by the present inventors that when x can be decreased, such as from about 0.6 to about 0.5, and when fluorination is provided, such as at a level of about 12%, comparable results are provided.

In a preferred embodiment of the present invention, the copolymer comprises a greater amount, in terms of weight percent, of PSX blocks as compared to PEI blocks. Thus, for example, in this embodiment x will be a value of greater than 0.5, such as from about 0.51 to about 0.99. Preferably, the ratio x is from about 0.51 to about 0.8, more preferably from about 0.51 to about 0.75 or from about 0.51 to about 0.65, and even more preferably from about 0.55 to about 0.6. It has been discovered that copolymers according to this embodiment provide particularly preferred properties, in terms of improved capture efficiency of the toner material on the copolymer-coated substrate surface, which in turn provides improved final print quality particularly in ballistic aerosol marking processes. For example, as the weight percent of PSX blocks decreases, the copolymer has less affinity for silicone release oils, which are often used in imaging process to assist toner release from the member's surface. Also, as the weight percent of PSX blocks decreases, the copolymer tends to become less elastomeric.

According to the present invention, the copolymer can have any desired molecular weight, based on the desired use and properties of the final product. Preferably, the copolymer has a molecular weight average molecular weight of from about 20,000 to about 400,000, more preferably from about 150,000 to about 300,000 as measured by gel permeation chromatography, using a polystyrene standard.

Although the polymer segments are described above generally with respect to unmodified or unsubstituted materials, the present invention is by no means limited to such embodiments. Rather, in an embodiment of the present invention, it was discovered that modification of the polymer segments, such as by fluorination of the PEI segment, still further improved results can be obtained.

Thus, in an embodiment of the present invention, the PEI segment is optionally halogenated, such as fluorinated. Fluorination can be accomplished, for example, by using starting materials that themselves include fluorine, or by addition of fluorine-containing components that react with or otherwise become incorporated into the polymer segments. For example, fluorinated diamines and/or fluorinated dianhydrides can be used to provide fluorinated PEI copolymer segments.

By way of example only, suitable fluorinated starting materials can include, but are not limited to, diamines and/or dianhydrides that include hexafluoroisopropylidene groups. Other suitable materials are disclosed in, for example, J. de Abajo et al., *Progress in Polyimide Chemistry* 1, H. R. Kricheldorf (editor), Springer, 2000, the entire disclosure of which is incorporated herein by reference. See, for example, the reference at p. 47 and Table 6.

When incorporated into the copolymer structure, the functional species, such as fluorination, should preferably be present in an amount of from about 1 to about 50% by weight, based on a total weight of the copolymer. Preferably, the functional species, such as fluorination, is present in an amount of from about 2 to about 30% by weight, even more preferably from about 5 to about 20% by weight, based on a total weight of the copolymer. For example, acceptable results are obtained where the functional species, such as fluorination, is present in an amount of from about 12 to about 17% by weight, based on a total weight of the copolymer.

In preparing suitable imaging members according to the present invention, the PEI-PSX copolymer is used as a surface release layer on otherwise-conventional fuser members, fixing members, ballistic aerosol marking transfuse or transfix members, and the like. Thus, the respective members can be prepared by utilizing the conventional member, and either replacing the existing surface layer with a surface layer comprising the PEI-PSX copolymer of the present invention, or by applying a surface layer comprising the PEI-PSX copolymer of the present invention over the existing surface layer. The resultant members can be used in oil applications, where a separate release oil is applied to the member's surface, or in oil-free applications where a separate surface release oil is not employed.

Additional optional materials may also be included in the surface release material of the present invention. It is preferred that any fillers be substantially non-reactive with the material so that no adverse reaction occurs between the polymer material and the filler that would hinder curing or otherwise negatively affect the strength properties of the outer surface material.

For example, conductive or thermal conductive fillers may be dispersed in the layer. Other optional adjuvants and fillers that may be incorporated in the surface include, for example, thermal stabilizing agents, coloring agents, reinforcing fillers, processing aids, and the like. Metal oxides, such as cupric oxide and/or zinc oxide, can also be used to improve release. Metal oxides, such as copper oxide, aluminum oxide, magnesium oxide, tin oxide, titanium oxide, iron oxide, zinc oxide, manganese oxide, molybdenum oxide, and the like, carbon black, graphite, metal fibers and metal powder particles such as silver, nickel, aluminum, and the like, as well as mixtures thereof, can promote thermal conductivity. Inorganic particulate fillers can increase the abrasion resistance of the polymeric outer fusing layer. Examples of such fillers include metal-containing fillers, such as a metal, metal alloy, metal oxide, metal salt, or other metal compound; the general classes of suitable metals include those metals of Groups 1b, 2a, 2b, 3a, 3b, 4a, 4b, 5a, 5b, 6b, 7b, 8, and the rare earth elements of the Periodic Table. Specific examples of such fillers are oxides of aluminum, copper, tin, zinc, lead, iron, bismuth, zinc, iridium, ruthenium, tungsten, manganese, vanadium, chromium, magnesium, nickel, and alloys thereof. Also suitable are reinforcing calcined alumina and non-reinforcing tabular alumina.

The PEI-PSX copolymer may be coated on the member substrate by any desired or suitable means, including by spraying, dipping, etc. A flow coating apparatus may also be used to flow coat a series of rolls. The copolymer, including with any fillers therein, may be diluted with a solvent, and particularly an environmentally friendly solvent, prior to application to the substrate.

Following coating, the copolymer is heated stepwise to remove solvent and convert the polyamic acid to the polyimide. With combination of hard segments (polyimide) and soft segments (polysiloxane), the coating obtained according to the present invention is a thermoplastic elastomer. It is not crosslinked as is a thermoset elastomer such as VITON™ or silicone rubber, and it is not cured in the sense of the thermosets.

The members of the present invention, for example fuser members, fixing members, transfer members, transfuse members, and transfix members, all of which are further described as to their respective functions below, may take any suitable form, including film form, belt form, roll form, plate form, etc. The term "member" as used herein is intended to refer to such members regardless of form. The term "fuser member" as used herein refers to fuser members including fusing rolls, belts, films, sheets, and the like; donor members, including donor rolls, belts, films, sheets, and the like; and pressure members, including pressure rolls, belts, films, sheets, and the like; and other members useful in the fusing system of an electrostatographic or xerographic, including digital, machine, as well as ballistic aerosol marking machines. The fuser members of the present invention can be employed in a wide variety of machines, and is not specifically limited in its application.

The members are generally comprised of at least a substrate and the overcoating of the surface release layer material of the present invention. As the substrate, materials such as metals, plastics, rubbers and fabrics may be used.

In one preferred embodiment, the member is made of a hollow cylindrical metal core, such as copper, aluminum, stainless steel, or certain plastic materials chosen to maintain rigidity and structural integrity, as well as being capable of having a polymeric material coated thereon and adhered firmly thereto. The supporting substrate may be a cylindrical sleeve, preferably with an outer polymeric layer of from about 1 to about 6 millimeters.

Also suitable are quartz and glass substrates. The use of quartz or glass cores in members allows for a light weight, low cost system member to be produced. Moreover, the glass and quartz help allow for quick warm-up, and are therefore energy efficient and ideal for use in fuser members where heat is desired. In addition, because the core of the member comprises glass or quartz, there is a real possibility that such members can be recycled. Moreover, these cores allow for high thermal efficiency by providing superior insulation.

When the member is a belt, the substrate can be of any desired or suitable material, including plastics, such as ULTEM, available from General Electric, ULTRAPEK, available from BASF, PPS (polyphenylene sulfide) sold under the tradenames FORTRON, available from Hoechst Celanese, RYTON R-4, available from Phillips Petroleum, and SUPEC, available from General Electric; PAI (polyamide imide), sold under the tradename TORLON 7130, available from Amoco; polyketone (PK), sold under the tradename KADEL E1230, available from Amoco; PI (polyimide); polyaramide; PEEK (polyether ether ketone), sold under the tradename PEEK 450GL30, available from Victrex; polyphthalamide sold under the tradename AMODEL, available from Amoco; PES (polyethersulfone); PEI (polyetherimide); PAEK (polyaryletherketone); PBA (polyparabanic acid); silicone resin; and fluorinated resin, such as PTFE (polytetrafluoroethylene); PFA (perfluoroalkoxy); FEP (fluorinated ethylene propylene); liquid crystalline resin (XYDAR), available from Amoco; and the like, as well as mixtures thereof. These plastics can be filled with glass or other minerals to enhance their mechanical strength without changing their thermal properties. In preferred embodiments, the plastic comprises a high temperature plastic with superior mechanical strength, such as polyphenylene sulfide, polyamide imide, polyimide, polyketone, polyphthalamide, polyether ether ketone, polyethersulfone, and polyetherimide.

Suitable materials also include silicone rubbers. Suitable silicone rubbers include room temperature vulcanization (RTV) silicone rubbers, high temperature vulcanization (HTV) silicone rubbers, and low temperature vulcanization (LTV) silicone rubbers. These rubbers are known and are readily available commercially such as SILASTIC 735 black RTV and SILASTIC 732 RTV, both available from Dow Corning, and 106 RTV Silicone Rubber and 90 RTV Silicone Rubber, both available from General Electric. Other suitable silicone materials include the silanes, siloxanes (preferably polydimethylsiloxanes), such as fluorosilicones, dimethylsilicones, liquid silicone rubbers, such as vinyl crosslinked heat curable rubbers or silanol room temperature crosslinked materials, and the like.

Fabric materials may also be used as a substrate material. Fabrics are materials made from fibers or threads and woven, knitted or pressed into a cloth or felt type structures. Woven, as used herein, refers to closely oriented by warp and filler strands at right angles to each other. Nonwoven, as used herein, refers to randomly integrated fibers or filaments. The fabric material useful as the substrate herein must be suitable for allowing a high operating temperature (i.e., greater than about 180° C., preferably greater than 200° C.), capable of exhibiting high mechanical strength, providing heat insulating properties (this, in turn, improves the thermal efficiency of a fusing system), and possessing electrical insulating properties. In addition, it is preferred that the fabric substrate have a flexural strength of from about 2,000,000 to about 3,000,000 psi, and a flexural modulus of from about 25,000 to about 55,000 psi. Examples of suitable fabrics include woven or nonwoven cotton fabric, graphite fabric, fiberglass, woven or nonwoven polyimide for example KEVLAR (available from DuPont), woven or nonwoven polyamide, such as nylon or polyphenylene isophthalamide (for example, NOMEX of E. L. DuPont of Wilmington, Del.), polyester, polycarbonate, polyacryl, polystyrene, polyethylene, polypropylene, and the like.

One or more other optional intermediate layers, such as adhesive layers or other suitable cushion layers or conductive layers, can also be incorporated between the outer surface release layer and the substrate. Optional intermediate adhesive layers and/or polymer layers can be applied to achieve desired properties and performance objectives. An adhesive intermediate layer can be selected from, for example, epoxy resins and polysiloxanes. Preferred adhesives include materials such as Union Carbide A-1100, Dow TACTIX 740, Dow TACTIX 741, Dow TACTIX 742, Dow Corning P5200, Dow Corning S-2260, Union Carbide A-1100, and United Chemical Technologies A0728. A particularly preferred curative for the aforementioned adhesives is Dow H41. Preferred adhesive(s) for adhesion are A4040 silane, available from Dow Corning Corp., Dow Corning 1200, also available from Dow Corning, and S-11 silane, available from Grace Specialty Polymers.

Other materials suitable for intermediate layers include polyimides, silicone rubbers and fluoroelastomers, including those commonly used as fuser or transfer member outer layers. As silicone rubber materials can swell as discussed above, aluminum oxide may be added in a relatively small amount to the material to reduce the swell and increase the transmissibility of heat. This increase in heat transmissibility is preferred in fusing members. In addition to the aluminum oxide, other metal oxides and/or metal hydroxides can be used. Such metal oxides and/or metal hydroxides include tin oxide, zinc oxide, calcium hydroxide, magnesium oxide, lead oxide, chromium oxide, copper oxide, and the like, as well as mixtures thereof.

The optional intermediate layers typically have a thickness of from about 0.05 to about 10 millimeters, preferably from about 0.1 to about 5 millimeters, and more preferably from about 1 to about 3 millimeters, although the thickness can be outside of these ranges.

Referring to FIG. 1, in a typical electrostatographic reproducing apparatus, a light image of an original to be copied is recorded in the form of an electrostatic latent image on a photosensitive member, and the latent image is subsequently rendered visible by the application of thermoplastic resin particles commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface in image configuration, they are transferred to a copy sheet 16 by transfer means 15, which can be pressure transfer, electrostatic transfer, or the like. Alternatively, the developed image can be transferred to an intermediate transfer member and subsequently transferred to a copy sheet as explained below.

After transfer of the developed image to the image receiving substrate, copy sheet 16 advances to fusing station 19, depicted in FIG. 1 as fusing and pressure members (rolls), wherein the developed image is fused to copy sheet 16 by passing copy sheet 16 between fusing member 20 and pressure member 21, thereby forming a permanent image. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
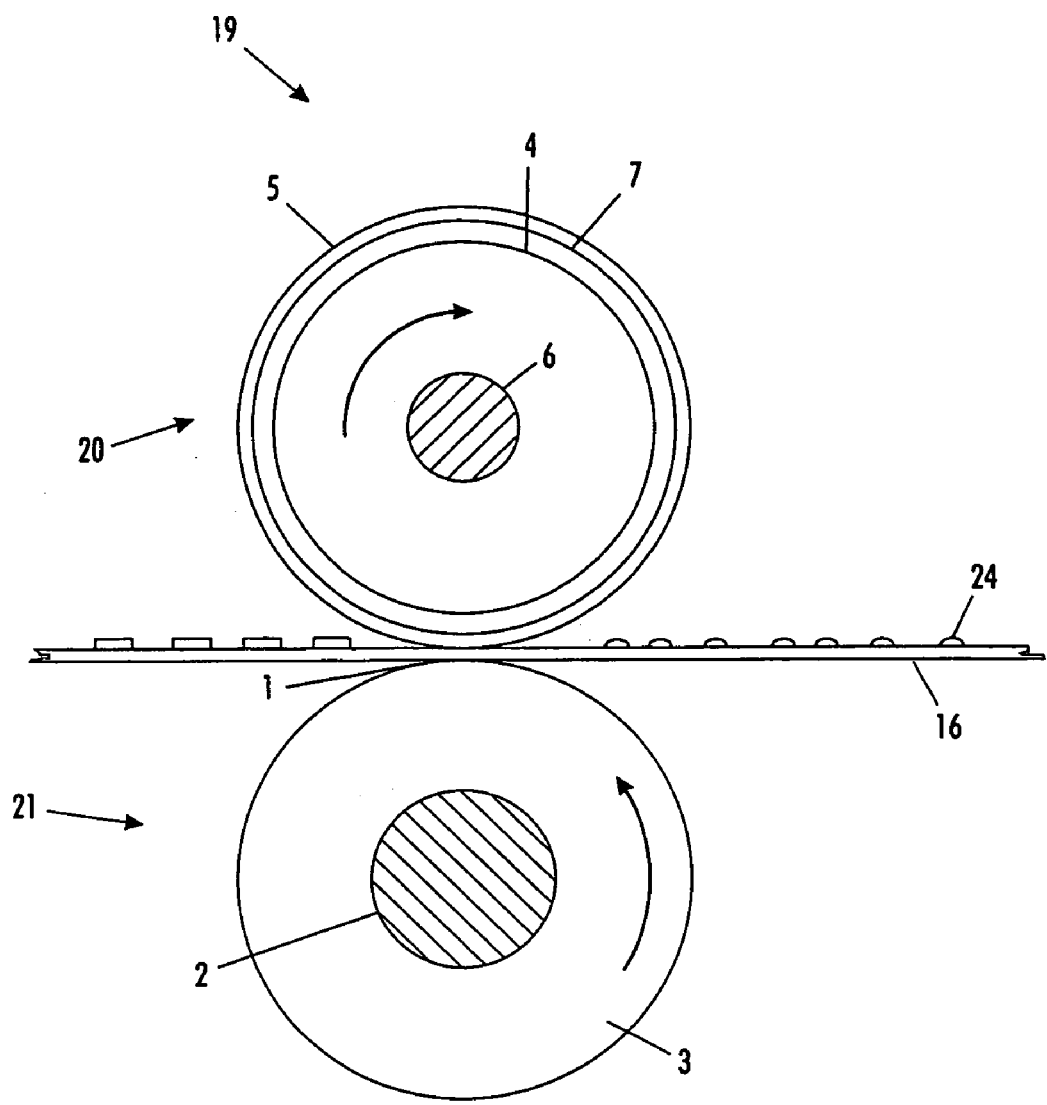
FIG. 2 illustrates a fusing system in accordance with an embodiment of the present invention.

Referring to FIG. 2, an embodiment of a fusing station 19 is depicted with an embodiment of a fuser roll 20 comprising the PEI-PSX copolymer material 5 on a suitable base member or substrate 4, which may have a suitable heating element 6 disposed in the hollow portion thereof which is coextensive with the cylinder. The fuser member 20 optionally can include an adhesive, cushion, or other suitable layer 7 positioned between core 4 and outer layer 5. Backup or pressure roll 21 cooperates with fuser roll 20 to form a nip or contact arc 1 through which a copy paper or other substrate 16 passes such that toner images 24 thereon contact surface 5 of fuser roll 20. As shown in FIG. 2, an embodiment of a backup roll or pressure roll 21 is depicted as having a rigid steel core 2 with a polymer or elastomer surface or layer 3 thereon. The pressure member 21 can also optionally include a heating element (not shown).

If an intermediate transfer member is employed, the developed image is transferred from the imaging member to an intermediate transfer member. The image can be either a single image or a multi-image. In a multi-image system, each of the images may be formed on the imaging member and developed sequentially and then transferred to the intermediate transfer member, or in an alternative method, each image may be formed on the imaging member, developed, and transferred in registration to the intermediate transfer member.

The transfer members of the instant invention may be employed in either an image on image transfer or a tandem transfer of a toned image(s) from the photoreceptor to the intermediate transfer component, or in a transfix system for simultaneous transfer and fusing the transferred and developed latent image to the copy substrate. In an image on image transfer, the color toner images are first deposited on the photoreceptor and all the color toner images are then transferred simultaneously to the intermediate transfer component. In a tandem transfer, the toner image is transferred one color at a time from the photoreceptor to the same area of the intermediate transfer component.

Transfer of the developed image from the imaging member to the intermediate transfer element and transfer of the image from the intermediate transfer element to the substrate can be by any suitable technique conventionally used in electrophotography, such as corona transfer, pressure transfer, bias transfer, and combinations of those transfer means, and the like. In the situation of transfer from the intermediate transfer medium to the substrate, transfer methods such as adhesive transfer, wherein the receiving substrate has adhesive characteristics with respect to the developer material, can also be employed. Typical corona transfer entails contacting the deposited toner particles with the substrate and applying an electrostatic charge on the surface of the substrate opposite to the toner particles. A single wire corotron having applied thereto a potential of between about 5,000 and about 8,000 volts provides satisfactory transfer. In a specific process, a corona generating device sprays the back side of the image receiving member with ions to charge it to the proper potential so that it is tacked to the member from which the image is to be transferred and the toner powder image is attracted from the image bearing member to the image receiving member. After transfer, a corona generator charges the receiving member to an opposite polarity to detach the receiving member from the member that originally bore the developed image, whereupon the image receiving member is separated from the member that originally bore the image.

For color imaging, typically, four image forming devices are used. The image forming devices may each comprise an image receiving member in the form of a photoreceptor of other image receiving member. The intermediate transfer member of an embodiment of the present invention is supported for movement in an endless path such that incremental portions thereof move past the image forming components for transfer of an image from each of the image receiving members. Each image forming component is positioned adjacent the intermediate transfer member for enabling sequential transfer of different color toner images to the intermediate transfer member in superimposed registration with one another.

The transfer member moves such that each incremental portion thereof first moves past an image forming component and comes into contact with a developed color image on an image receiving member. A transfer device, which can comprise a corona discharge device, serves to effect transfer of the color component of the image at the area of contact between the receiving member and the intermediate transfer member. In a like fashion, image components of colors such as red, blue, brown, green, orange, magenta, cyan, yellow and black, corresponding to the original document also can be formed on the intermediate transfer member one color on top of the other to produce a full color image.

A transfer sheet or copy sheet is moved into contact with the toner image on the intermediate transfer member. A bias transfer member may be used to provide good contact between the sheet and the toner image at the transfer station. A corona transfer device also can be provided for assisting the bias transfer member in effecting image transfer. These imaging steps can occur simultaneously at different incremental portions of the intermediate transfer member. Further details of the transfer method employed herein are set forth in U.S. Pat. No. 5,298,956 to Mammino, the disclosure of which is hereby incorporated by reference in its entirety.

Figure 3:
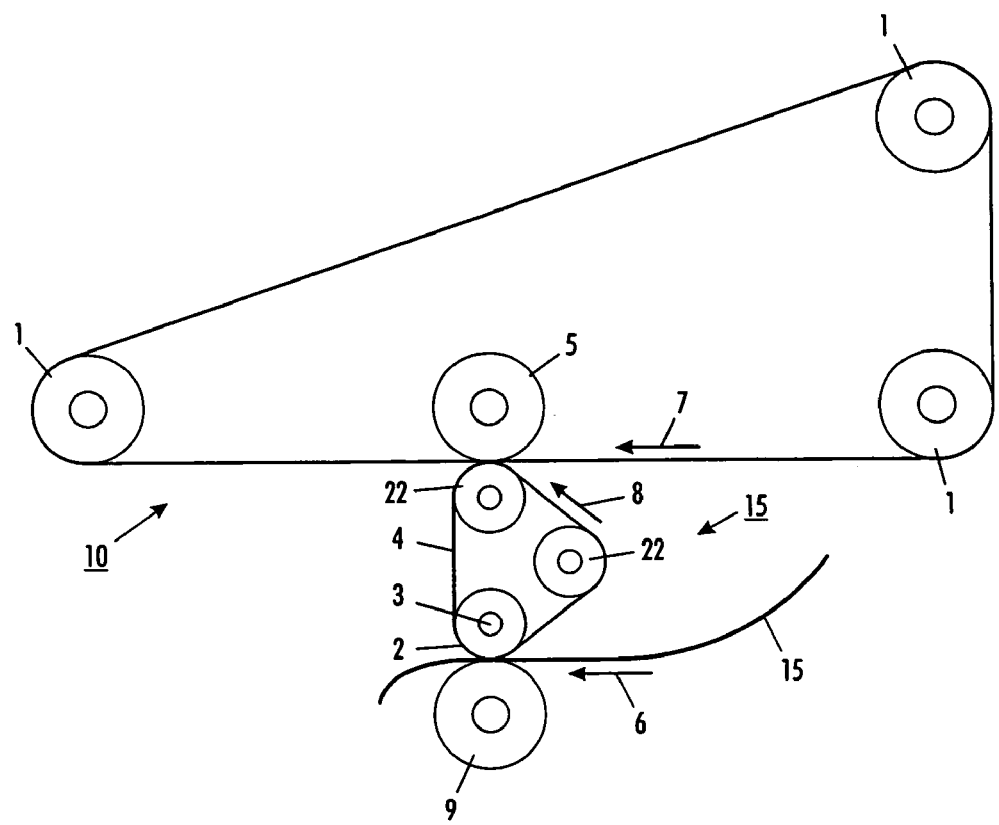
FIG. 3 is an illustration of an embodiment of the present invention, and represents a transfix member.

Transfer and fusing may occur simultaneously in a transfix configuration. As shown in FIG. 3, a transfer apparatus 15 is depicted as transfix belt 4 being held in position by driver rollers 22 and heated roller 2. Heated roller 2 comprises a heater element 3. Transfix belt 4 is driven by driving rollers 22 in the direction of arrow 8. The developed image from photoreceptor 10 (which is driven in direction 7 by rollers 1) is transferred to transfix belt 4 when contact with photoreceptor 10 and belt 4 occurs. Pressure roller 5 aids in transfer of the developed image from photoreceptor 10 to transfix belt 4. The transferred image is subsequently transferred to copy substrate 16 and simultaneously fixed to copy substrate 16 by passing the copy substrate 16 between belt 4 (containing the developed image) and pressure roller 9. A nip is formed by heated roller 2 with heating element 3 contained therein and pressure roller 9. Copy substrate 16 passes through the nip formed by heated roller 2 and pressure roller 9, and simultaneous transfer and fusing of the developed image to the copy substrate 16 occurs.

As described above, the present invention is equally applicable to various members of a ballistic aerosol-marking apparatus, such as a transfuse member. The use and principle of operation of such members are known in the art, and described in the various U.S. patents incorporated by reference above. Accordingly, a further detailed discussion of the apparatus and printing process is not included herein.

In the context of a ballistic aerosol marking apparatus, it was unexpectedly discovered that use of the PEI-PSX block copolymers of the present invention, in forming transfuse members and the like, provides the unexpected result if improved image quality. It is believed that the PEI-PSX copolymer more effectively captures the toner particles, and thus presents the toner particles from straying away from their intended location. When the toner particles stray from their intended location, the result is reduced image quality, as the sharpness or resolution of the image is degraded. Thus, for example, where a thin line is to be printed, toner stray results in less sharpness of the line, with some toner particles being dispersed around the line itself. The present invention overcomes this problem, by improved toner capture.

EXAMPLES

Example 1

Polymer Synthesis

A polyetherimide-b-polysiloxane block copolymer is prepared according to the present invention. A reaction is carried out in a 500 mL Morton flask equipped with a mechanical stirrer, argon inlet and outlet, septum port, and addition funnel. All glassware is dried overnight at 110° C. and assembled hot while purging with argon. The stirring rate is set to about 250 rpm. A dianhydride. 3.4 g of 4,4'-oxydiphthalic anhydride is dissolved in a mixture of 55 mL anhydrous tetrahydrofuran (Aldrich) and 30 mL N-methylpyrrolidone in the stirred Morton flask. A solution of 3.9 g 4,4'-(4,4-isopropylidenediphenyl-1,1'-diyldioxy)dianiline and 7.5 g polydimethylsiloxane, bisaminopropyl terminated (nominal molecular weight 3,000; NMR indicates 3,600) in 40 mL anhydrous tetrahydrofuran is created in a separate flask under anhydrous conditions and transferred to the addition funnel by syringe techniques. Slow addition of the diamine solution requires two hours. The reactor contents are stirred for a further two hours and then removed from the vessel. A sample of the polyamic acid produced is cured to a polyimide by heating at 80° C. for two hours, followed by 120° C. for 30 minutes, 160° C. for 30 minutes, and 210° C. for five hours. The cured polyetherimide-b-polysiloxane has a weight average molecular weight of 60,000 (as polystyrene equivalents) and a polydispersity of 2.58. The nominal level of siloxane content is 51% by weight. NMR spectroscopy confirms inclusion of the polysiloxane segments. Cured free-standing films of the polymeric material have a small elastic response to being stretched by hand.

Examples 2 and 3

Modified Polymer Synthesis

The procedures of Example 1 are repeated, except that amounts and types of reactants and varied to provide modified polymeric materials.

In Example 2, the polyetherimide block of the copolymer material consists of 4,4'-oxydiphthalic anhydride with 4,4'-(4,4-isopropylidenediphenyl-1,1'-diyldioxy)dianiline, as in Example 1, except that the polysiloxane amount is adjusted such that the resultant copolymer material includes only 36 wt % polysiloxane.

In Example 3, the polyetherimide block of the copolymer material consists of 4,4'-(hexafluoroisopropylidene) diphthalic anhydride with 4",4'"-(hexafluoroisopropylidene)bis( 4-phenoxyaniline). The resultant copolymer material includes 31 wt % polysiloxane, but also includes 17 wt % fluorine.

Example 4

Fuser Roll Coating

Conventional fuser rolls are obtained, which are fuser rolls for a Xerox 5760, which fuser rolls have a surface release layer of VITON fluorocarbon elastomer. The fuser rolls had been previously used, and are cleaned prior to recoating by dipping in tetrahydrofuran and wiping with paper towels saturated in tetrahydrofuran or N-methylpyrrolidone.

Test coatings are obtained by dip coating the polyamic acid precursor solutions of Examples 1, 2 and 3 over the existing VITON layer of the fuser rolls. The dip coating is performed by cup-coating (reverse-Tsukiage) at a rate of 500 mm/min. The coatings are allowed to air dry for ten minutes, and then cured in a convection oven according to the following heating profile: 80° C. for 2 hours (65° C. for 2.5 hours), 120° C. for 30 minutes, 160° C. for 60 minutes, 211° C. for 15 hours.

Comparative Example 1

Conventional VITON Fuser Roll

As a Comparative Example, a conventional fuser roll is obtained, which is a fuser roll for a Xerox 5760, which fuser roll has a surface release layer of VITON fluorocarbon elastomer. This fuser roll is identical to the fuser rolls that are subsequently further coated in Example 4, above.

Example 5

Fuser Roll Testing

The fuser rolls of Example 4 and Comparative Example 1 are tested on a Xerox 5760 fusing fixture using a cyan toner composition on Color Xpressions, 90 gsm paper with an Empress machine.

The fuser roll of Comparative Example 1 is tested using silicone oil with amino substitution at fuser roll and pressure roll temperatures of 130, 140, 150, 160, 170, 180, 190, 200 and 210° C. Unfused images are evaluated for fusing at the various temperatures. Cold offset is observed at 130° C. while hot offset is observed only at 210° C. Excellent prints with maximal gloss at 170° C. are produced.

The coated fuser rolls of Example 4 (using the polymer material of Examples 1 and 2) are fuser tested with the control fuser roll of Comparative Example 1. The results are as follows:

| Sheet Through[1] | Toner/ Substrate | Fuser Roll | Release Oil | Fusing Result at 150 C. |
|---|---|---|---|---|
| 2 | Cyan toner 1/ Color Xpressions 90 gsm | Control (Comp. Ex. 1) | Amino substituted silicone oil | Releases without any offsetting |
| 1 | Cyan toner 2/ | Example 1 | Minimal/no oil | No Offset |
| 2 | Color | | | No Offset |
| 3 | Xpressions 90 gsm | | | No Offset |
| 1 | Cyan toner 1/ Color Xpressions 90 gsm | Example 1 | Amino substituted silicone oil | Very Slight Offset |
| 1 | | | | No Offset |
| 2 | | | | No Offset |
| 3 | | | | No Offset |
| 1 | Cyan toner 1/ Color Xpressions 90 gsm | Example 2 | Amino substituted silicone oil | Wraps/ Offset |
| 2 | | | | Wraps/ Offset |
| 3 | | | | Wraps/ Offset |
| 1 | Cyan toner 1/ Color Xpressions 90 gsm | Example 2 | Xerox Fuser Oil (polydimethyl-siloxane) | Wraps/ Offset |
| 2 | | | | Wraps/ Offset |
| 3 | | | | Wraps/ Offset |
| 1 | Cyan toner 2/ Color Xpressions 90 gsm | Example 2 | Minimal/no oil | Offset |
| 2 | | | | Offset |
| 3 | | | | Offset |
| 6 | | | | Offset |

NOTES:
[1]"Sheet Through" refers to the order that a sheet of paper is passed through the fuser following application of oil to the fuser roll. Thus the higher the number the longer it has been since the roll was oiled and the lower the level of fuser oil.

The testing is also conducted using the fuser roll of Example 3. However, release from this Example is found to be worse than that for the fuser roll of Example 2, failing to release an already fused image that is used to measure the nip width between the fuser and pressure rolls. Poor release and significant offset is also observed with both cyan toner 1 and cyan toner 2 on Color Xpressions paper.

Example 6

Polymer Synthesis

This Example demonstrates the production of a polyetherimide-b-polysiloxane block copolymer having a weight ratio of polyetherimide to polysiloxane of 41:59.

A polyetherimide-b-polysiloxane block copolymer is prepared according to the present invention. A reaction is carried out in a 1000 mL Morton flask equipped with a mechanical stirrer, argon inlet and outlet, septum port, and addition funnel. All glassware is dried overnight at 110° C. and assembled hot while purging with argon. The stirring rate is set to about 250 rpm. A dianhydride, 7.6 g of 4,4'-oxydiphthalic anhydride is dissolved in a mixture of 120 mL anhydrous tetrahydrofuran (Aldrich) and 60 mL N-methylpyrrolidone in the stirred Morton flask. A solution of 7.4 g 4,4'-(4,4-isopropylidenediphenyl-1,1'-diyldioxy)dianiline and 22 g polydimethylsiloxane, bisaminopropyl terminated (consisting of a mixture of nominal molecular weights 3,000 and 27,000 in a respective ratio of 88.5:11.5) in 100 mL anhydrous tetrahydrofuran is created in a separate flask under anhydrous conditions and transferred to the addition funnel by syringe techniques. Slow addition of the diamine solution requires two hours. The reactor contents are stirred for a further two hours and then removed from the vessel. Samples of the polyamic acid are coated on a Kapton composite film. The films are prepared by both spin coating and "flood" coating, where "flood" coating includes allowing an undrawn pool of polyamic acid solution to evaporate in the surface. The films are cured to a polyimide by heating at 80° C. for two hours, followed by 120° C. for 30 minutes, 160° C. for 30 minutes, and 220° C. for fifteen hours.

Example 7

Polymer Synthesis

This Example demonstrates the production of a polyetherimide-b-polysiloxane block copolymer having a weight ratio of polyetherimide to polysiloxane of 51:49, but containing 12 wt % fluorine.

A polyetherimide-b-polysiloxane block copolymer is prepared according to the present invention. A reaction is carried out in a 1000 mL Morton flask equipped with a mechanical stirrer, argon inlet and outlet, septum port, and addition funnel. All glassware is dried overnight at 110° C. and assembled hot while purging with argon. The stirring rate is set to about 250 rpm. A dianhydride, 6.6 g of 4,4'-(hexafluoroisopropylidene)diphthalic anhydride is dissolved in a mixture of 40 mL anhydrous tetrahydrofuran (Aldrich) and 20 mL N-methylpyrrolidone in the stirred Morton flask. A solution of 5.7 g 4',4'''-(hexafluoroisopropylidene)bis(4-phenoxyaniline) and 13 g polydimethylsiloxane, bisaminopropyl terminated (consisting of a mixture of nominal molecular weights 3,000 and 27,000 in a respective ratio of 88.5:11.5) in 70 mL anhydrous tetrahydrofuran is created in a separate flask under anhydrous conditions and transferred to the addition funnel by syringe techniques. Slow addition of the diamine solution requires two hours. The reactor contents are stirred for a further two hours and then removed from the vessel. Samples of the polyamic acid are coated on a Kapton composite film. The films are prepared by both spin coating and flood coating, where "flood" coating includes allowing an undrawn pool of polyamic acid solution to evaporate in the surface. The films are cured to a polyimide by heating at 80° C. for two hours, followed by 120° C. for 30 minutes, 160° C. for 30 minutes, and 220° C. for fifteen hours.

Example 8

Polymer Synthesis

This Example demonstrates the production of a polyetherimide-b-polysiloxane block copolymer having a weight ratio of polyetherimide to polysiloxane of 50:50.

A polyetherimide-b-polysiloxane block copolymer is prepared according to the present invention. A reaction is carried out in a 1000 mL Morton flask equipped with a mechanical stirrer, argon inlet and outlet, septum port, and addition funnel. All glassware is dried overnight at 110° C. and assembled hot while purging with argon. The stirring rate is set to about 250 rpm. A dianhydride, 7 g of 4,4'-oxydiphthalic anhydride is dissolved in a mixture of 100 mL anhydrous tetrahydrofuran (Aldrich) and 60 mL N-methylpyrrolidone in the stirred Morton flask.

A solution of 6 g 4,4'-(4,4-isopropylidenediphenyl-1,1'-diyldioxy)dianiline and 13.8 g polydimethylsiloxane, bisaminopropyl terminated (nominal molecular weight 1750) in 70 mL anhydrous tetrahydrofuran is created in a separate flask under anhydrous conditions and transferred to the addition funnel by syringe techniques. Slow addition of the diamine solution requires two hours. The reactor contents are stirred for a further two hours and then removed from the vessel. Samples of the polyamic acid are coated on a Kapton composite film. The films are prepared by both spin coating and flood coating. The films are cured to a polyimide by heating at 80° C. for two hours, followed by 120° C. for 30 minutes, 160° C. for 30 minutes, and 220° C. for fifteen hours.

Example 9

Evaluation Testing in Ballistic Aerosol Marking Printing

The synthesized copolymers of Examples 6, 7 and 8 are tested as transfuse member coatings in a ballistic aerosol marking system. The respective copolymers are coated, by puddle coating and spin coating techniques, onto the base transfer belts, which consist of a Kapton polyimide film loaded with carbon black and polyaniline. The copolymer solutions are coated onto the transfuse belt from solution, the solution is evaporated to produce transparent solid polymer films on the black flexible film substrates. A three-inch square section of each film is cut and mounted onto the vertical platform in a ballistic aerosol marking printing fixture. A cyan toner composition is imaged onto the film at room temperature using a ballistic aerosol marking print head having a venture throat width of 15 microns, venturi divergence length of 250 microns, and a channel length of 2.75 mm. The input gas pressure is 80 psi, the toner flow cell pressure is 8.35 psi, and variable printing gap distances of 0.5, 1.0, 1.5 and 2.0 mm are used.

Optical images of the printed lines are used to determine print quality and toner scatter about the desired print line. Comparison of the print results shows that significantly less toner scatter is evident on the block copolymer material of Examples 6 and 7 as compared to the block copolymer material of Example 8.

In the print results on the block copolymer materials of Examples 6 and 7, solid lines are evident on the copolymer film, with little toner scatter around the edges of the lines. Better results are obtained as printing gap distance is increased from 0.5 to 1.5 mm. Equivalent results are provided by the spin and flood coated samples.

In the print results on the block copolymer material of Example 8, negative lines are obtained, i.e., rather than a single defined line, the toner tends to scatter around the desired line, forming essentially two parallel lines, but with significant toner scatter outside of the desired location. It is believe that these negative lines are formed because the film surface is too hard to capture the toner particles. Instead, the toner particles are carried by the gas and are deposited at areas around the desired print location. Equivalent results are provided by the spin and flood coated samples.

These results indicate that polyetherimide-b-polysiloxane block copolymers can suitably be used as surface layers on transfuse/transfix members for ballistic aerosol marking printing methods. However, the Examples demonstrate that print quality improvement can be provided by either increasing the polysiloxane content of the copolymer, and/or by introducing a halogen species such as fluorine into the copolymer structure.

While this invention has been described in conjunction with various exemplary embodiments, it is to be understood that many alternatives, modifications and variations would be apparent to those skilled in the art. Accordingly, Applicants intend to embrace all such alternatives, modifications and variations that follow in the spirit and scope of this invention.

What is claimed is:

1. A member for use in a copying device comprising at least a substrate and thereon a surface layer comprised of a polyetherimide-b-polysiloxane block copolymer comprising etherimide blocks and siloxane blocks, wherein said copolymer contains more than 50% by weight of said siloxane blocks, wherein said member is selected from the group consisting of a transfix member, and a transfuse member, and wherein said copying device is a ballistic aerosol marking printing system.

2. The member according to claim 1, wherein said copolymer contains halogen species in an amount of at least 5% by weight.

3. The member according to claim 1, wherein said etherimide blocks are represented by the following formula:

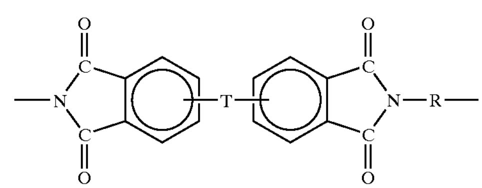

wherein T represents a divalent moiety selected from the group consisting of —O— and —O-Z-O—; Z is a divalent radical selected from the group consisting of:

-continued

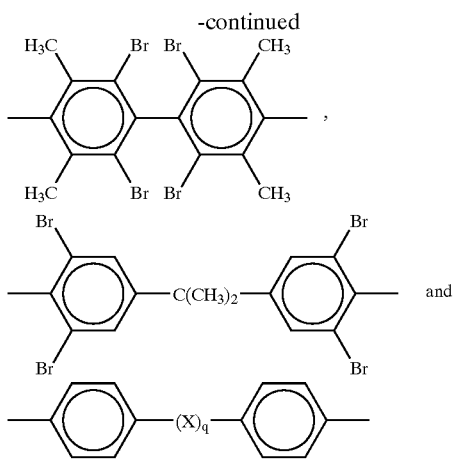

wherein X is a member selected from the group consisting of the following divalent radicals:

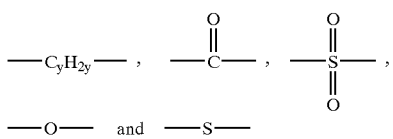

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula:

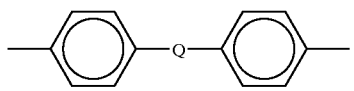

where Q is a member selected from the group consisting of:

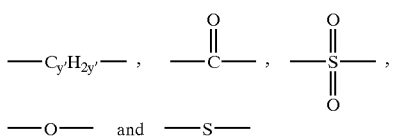

where y' is an integer from about 1 to about 5.

4. The member according to claim 1, wherein the siloxane blocks are represented by the following formula:

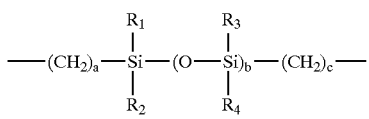

wherein: $R_1$, $R_2$, $R_3$ and $R_4$ are each independently ($C_1$–$C_6$) alkyl, a and c are each independently integers from 1 to 10, and b is an integer from 1 to about 400.

5. The member according to claim 1, wherein said ether-imide segments are made by reacting an aromatic bis(ether anhydride) with an organic diamine.

6. The member according to claim 5, wherein said aromatic bis(ether anhydride) is represented by:

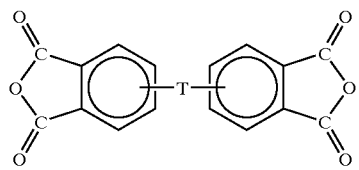

wherein T represents a divalent moiety selected from the group consisting of —O— and —O-Z-O—; Z is a divalent radical selected from the group consisting of:

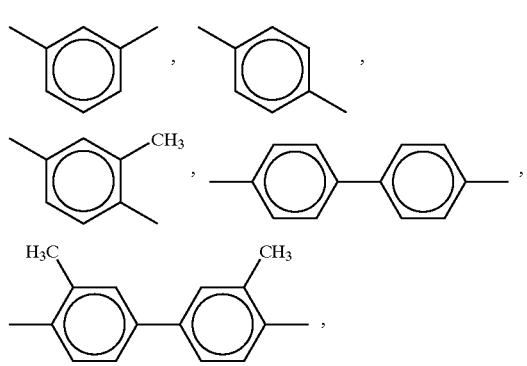

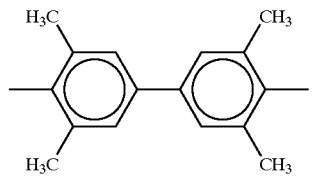

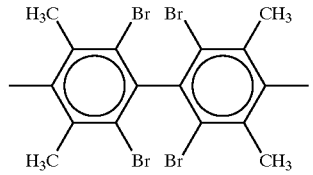

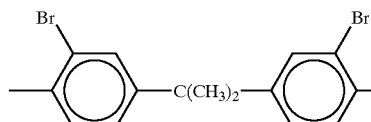

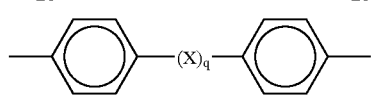

wherein X is a member selected from the group consisting of the following divalent radicals:

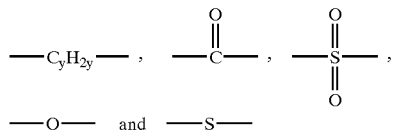

wherein y is an integer from 1 to about 5, and q is 0 or 1.

7. The member according to claim 5, wherein said aromatic bis(ether anhydride) is selected from the group consisting of 2,2-bis(4-(3,4-dicarboxyphenoxy)phenyl)propane dianhydride; 4,4'-bis(3,4-dicarboxyphenoxy)diphenyl ether dianhydride; 4,4'-bis(3,4-dicarboxyphenoxy)diphenyl sulfide dianhydride; 4, 4'-bis(3,4-dlicarboxyphenoxy)benzophenone dianhydride; 4,4'-bis(3,4-dicarboxyphenoxy)diphenyl sulfone dianhydride; 2,2-bis((4-(2,3-dicarboxyphenoxy) phenyl)propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, and mixtures thereof.

8. The member according to claim 5, wherein said organic diamine is represented by:

$$H_2N-R-NH_2$$

wherein R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula:

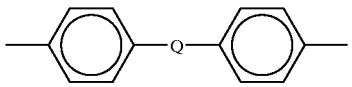

where Q is a member selected from the group consisting of formulae:

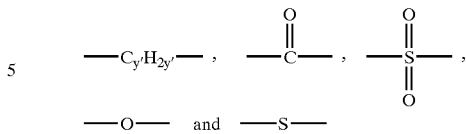

where y' is an integer from about 1 to about 5.

9. The member according to claim 5, wherein said organic diamine is selected from the group consisting of m-phenylenediamine; p-phenylenediamine; 4,4'-diaminodiphenylpropane, 4,4'-diaminodiphenylmethane; 4,4'-diaminodiphenyl sulfide; 4,4'-diaminodiphenyl sulfone; 4,4'-diaminodiphenyl ether; 1,5-diaminonaphthalene; 3,3-dimethylbenzidine; 3,3-dimethoxybenzidine; 2,4-bis(beta-amino-t-butyl)toluene; bis(p-beta-amino-t-butylphenyl) ether; bis(p-beta-methyl-o-aminophenyl)benzene; 1,3-diamino-4-isopropylbenzene; 1,2-bis(3-aminopropoxy) ethane; benzidine; m-xylylenediamine; 2,4-diaminotoluene; 2,6-diaminotoluene; bis(4-aminocyclohexyl)methane; 3-methylheptamethylenediamine; 4,4-dimethylheptamethylenediamine; 2,11-dodecanediamine; 2,2-dimethylpropylenediamine; 1,18-octamethylenediamine; 3-methoxyhexamethylenediamine; 2,5-dimethylhexamethylenediamine; 2,5-dimethylheptamethylenediamine; 3-methylheptamethylenediamine; 5-methylnonamethylenediamine; 1-4-cyclohexanediamine; 1,18-octadecanediamine; bis(3-aminopropyl)sulfide; N-methyl-bis(3-aminopropyl)amine; hexamethylenediamine; heptamethylenediamine; nonamethylenediamine; decamethylenediamine, and mixtures thereof.

10. The member according to claim 1, wherein the substrate is a metal, plastic or fabric.

11. The member according to claim 1, wherein the member has a film, belt, plate or roll configuration.

12. The member according to claim 1, wherein the member further comprises one or more intermediate layers between the substrate and the surface layer.

13. The member according to claim 1, wherein the surface layer further contains one or more additives selected from the group consisting of electrically conductive fillers, thermally conductive fillers, thermal stabilizing agents, coloring agents, reinforcing fillers and processing aids.

14. A device containing the member according to claim 1, wherein the device is a xerographic device, a printer or a direct marking device.

* * * * *